Nov. 19, 1929.   R. W. SKINNER   1,736,377
BELT FASTENER
Filed April 12, 1929
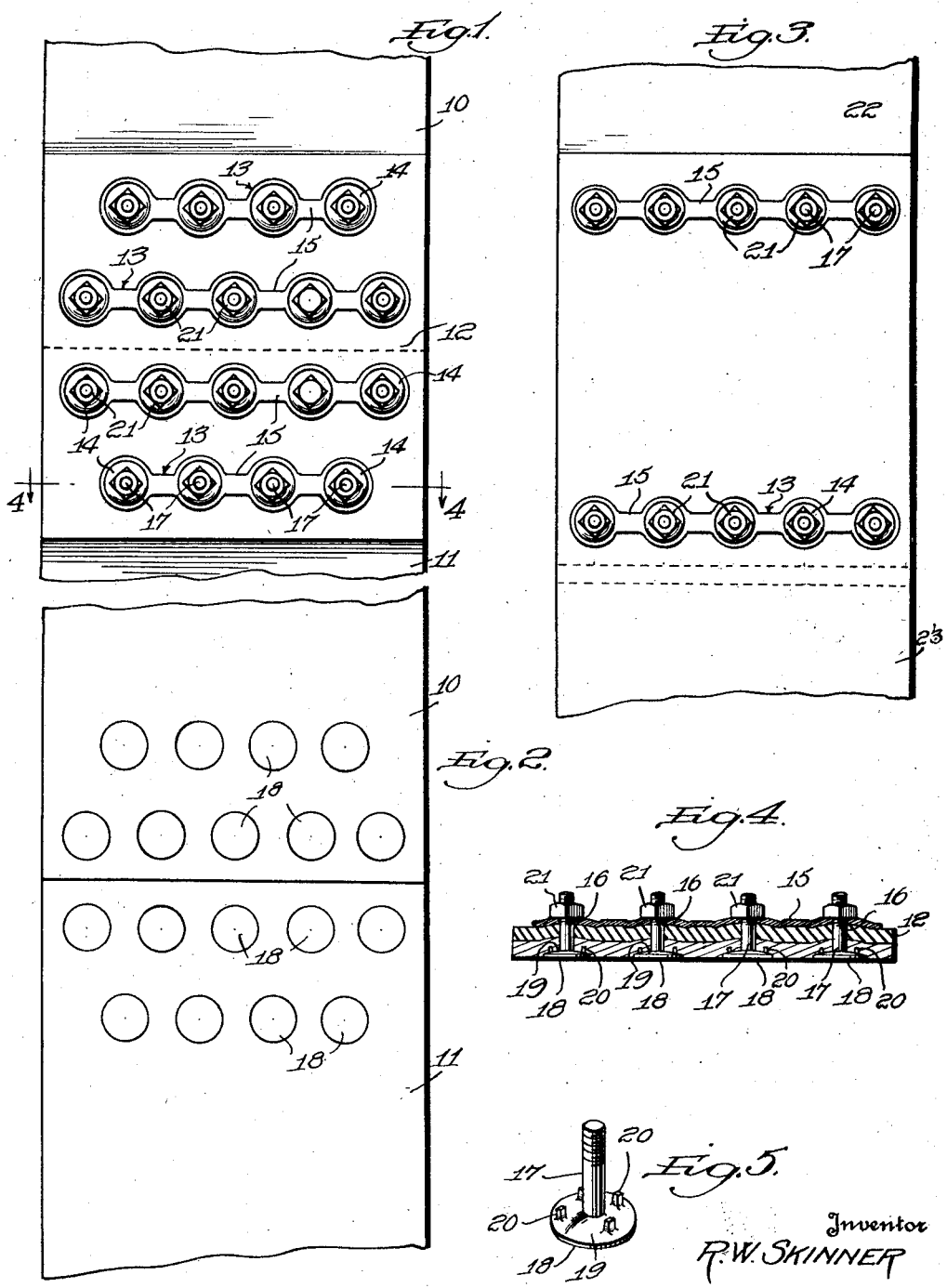
Inventor
R. W. SKINNER
By G. W. Earnshaw
Attorney Patented Nov. 19, 1929

1,736,377

UNITED STATES PATENT OFFICE

RAYMOND W. SKINNER, OF TULSA, OKLAHOMA

BELT FASTENER

Application filed April 12, 1929. Serial No. 354,605.

This invention relates to belt fasteners and particularly to that type of fastener used in securing together adjacent ends of pulley belts and the like.

An object of this invention is to provide a belt fastener that will make a strong and durable union and at the same time provide a smooth and longitudinally flexible inner belt surface where the connection is made.

Another object is to provide a device of the character referred to wherein a strip of substantially flat slightly flexible metal is arranged transversely across the belt surface, bolts and nuts being utilized to secure the metallic strip in position.

A further object is to provide a device of the character referred to wherein the bolt heads are provided with substantially conical inner faces having projections thereon, the bolt being adapted to be drawn into the belt until the outer face of the head is flush with the inner surface of the belt, the projections serving to prevent turning of the bolt and also serving to aid the bolt head in entering the belting material.

A further object is to provide a saddle when it is desired to secure the ends of the belt in abutting relation, a plurality of the metallic strips being used in conjunction with the saddle on each side of the abutting belt ends.

Other objects and advantages of this invention will become apparent during the course of the following description.

In the drawings I have shown several embodiments of the invention. In this showing:

Figure 1 is a top plan view,

Figure 2 is a bottom plan view,

Figure 3 is a plan view of a modified form of the device,

Figure 4 is a sectional view taken substantially on line 4—4 of Figure 1, and,

Figure 5 is a perspective view of one of the bolts.

Referring to the drawings the numerals 10 and 11 designate adjacent ends of a belt adapted to be secured together. As shown in Figure 2 the belt ends are arranged with their edges abutting and a saddle 12 preferably formed of belting material is arranged on the outer surface of the belt, overlapping the ends thereof, substantially as shown in Figure 1.

The numeral 13 indicates as a whole a strip of substantially flat, light, slightly flexible steel or other suitable material provided with a plurality of substantially circular portions 14 joined together by reduced portions 15 and each circular portion is provided with an opening 16. As shown in Figure 1, a plurality of the metal strips 13 are arranged transversely across the saddle plate 12, two or more of the strips 13 preferably being arranged at spaced intervals on each side of the abutting ends of the belt.

As shown in Figure 4, bolts 17 provided with substantially smooth circular heads 18 are adapted to extend through the belt, saddle and the openings in the circular portions of the metallic strips. The inner face of each bolt head 18 is substantially conical as shown at 19 and a plurality of upstanding projections 20 are arranged on this conical face. Nuts 21 are adapted to be threaded onto the bolts 17 as shown in Figure 4.

In Figure 3 I have shown how the metallic strips may be used without a saddle. The sections of belting 22 and 23 are arranged in overlapping instead of abutting relation and one of the metallic strips 13 is placed in position slightly spaced from each edge of the belting.

The operation of the device is as follows:

When it is desired to connect the ends of the belt, the edges thereof are arranged in abutting relation as shown in Figure 2. The saddle 12 is then placed to overlap the belt ends on the outer surface of the belt and a plurality of the metallic strips 13 are then arranged transversally across the saddle on both sides of the abutting ends of the belt. The bolts 17 are adapted to extend through openings in the belt and saddle and through the opening 16 in each circular portion of the metallic strip. The nuts 21 are then threaded onto the bolts and are adapted to be turned until the outer face of the bolt head is flush with the inner surface of the bolt, as shown in Figure 4. The projections 20 assist the bolt head in entering the belt and also prevent turning of the bolt head both while it is being drawn into position and after the face of the bolt head is flush with the inner belt surface.

The operation of the device as shown in Figure 3 is substantially the same as described except that the saddle is not utilized and the ends of the belt are arranged to overlap. The bolts 17 are drawn into position whereby the outer faces of the bolt heads will be flush with the inner surfaces of the belt as in the construction first described.

It will be apparent that I have provided novel means for fastening the ends of a belt together whereby a strong and durable union will be made and a substantially smooth and longitudinal flexible inner belt surface will result. Most pulleys are provided with a slightly raised central portion on their peripheries and the metallic strips 13 will flex enough to permit the portion of the belt where the union is made to follow the rest of the belt over the pulleys without danger of the belt slipping off.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. A belt fastener comprising a plurality of circular members joined together by reduced portions and adapted to be arranged transversely across a belt, each of said members being provided with an opening, bolts adapted to extend through said belt and said opening and provided with circular heads the inner faces of which are substantially conical, projections carried on said conical faces and adapted to extend into the belt, and means engaging said members for drawing the outer faces of the heads of said bolts to a position substantially flush with the inner surface of said belt.

2. A belt fastener comprising a saddle formed of belting material and arranged to overlap abutting ends of a belt which are to be secured together, a plurality of circular members joined together by reduced portions arranged transversely across the outer face of said saddle and on opposite sides of the ends of said belt, each of said members being provided with an opening, bolts adapted to extend through said belt, said saddle and said openings, said bolts being provided with smooth circular heads the inner faces of which are substantially conical, projections carried on said conical faces and adapted to extend into the belt, and means engaging said members for drawing the outer faces of the heads of said bolts to a position substantially flush with the inner surface of said belt.

3. A belt fastener comprising a saddle formed of belting material and arranged to overlap abutting ends of a belt to be secured together, a plurality of strips of substantially flat, light, slightly flexible metal arranged transversely across the outer face of said saddle and on opposite sides of the ends of said belt, each of said strips comprising a plurality of spaced circular portions having openings therein, each circular portion being connected by a reduced portion, bolts adapted to extend through said belt, said saddle and said openings, said bolts being provided with smooth circular heads the inner faces of which are substantially conical, projections carried on said conical faces and adapted to extend into said belt, and nuts threaded onto said bolts for drawing the outer faces of the heads thereof to a position substantially flush with the inner surface of said belt.

In testimony whereof I affix my signature.

RAYMOND W. SKINNER.